United States Patent
Lelievre et al.

(10) Patent No.: US 10,786,935 B2
(45) Date of Patent: Sep. 29, 2020

(54) HEADREST ASSEMBLY FOR VEHICLE SEAT AND VEHICLE SEAT COMPRISING SUCH AN ASSEMBLY

(71) Applicant: Faurecia Sièges d'Automobile, Nanterre (FR)

(72) Inventors: François Lelievre, Vanves (FR); Jérôme Planson, Angerville (FR); Stéphane Soltner, Mailleroncourt Charette (FR)

(73) Assignee: FAURECIA SIÉGES D'AUTOMOBILE, Nanterre (FR)

( * ) Notice: Subject to any disclaimer, the term of this patent is extended or adjusted under 35 U.S.C. 154(b) by 515 days.

(21) Appl. No.: 15/089,234

(22) Filed: Apr. 1, 2016

(65) Prior Publication Data
US 2016/0288676 A1    Oct. 6, 2016

(30) Foreign Application Priority Data
Apr. 2, 2015  (FR) .................................... 15 52877

(51) Int. Cl.
| | |
|---|---|
| *B29C 45/16* | (2006.01) |
| *B29C 45/14* | (2006.01) |
| *B60N 2/809* | (2018.01) |
| *B60N 2/829* | (2018.01) |
| *B60N 2/894* | (2018.01) |
| *B60N 2/897* | (2018.01) |

(Continued)

(52) U.S. Cl.
CPC .... *B29C 45/1671* (2013.01); *B29C 45/14467* (2013.01); *B60N 2/809* (2018.02); *B60N 2/829* (2018.02); *B29K 2705/00* (2013.01); *B29L 2031/3023* (2013.01); *B60N 2/894* (2018.02); *B60N 2/897* (2018.02)

(58) Field of Classification Search
CPC .......... B29C 45/1671; B29C 45/14467; B60N 2/829; B60N 2/809
USPC .......................................................... 297/410
See application file for complete search history.

(56) References Cited

U.S. PATENT DOCUMENTS

| | | |
|---|---|---|
| 7,410,219 B2 | 8/2008 | Kraft et al. |
| 2003/0020314 A1 | 1/2003 | Mauro et al. |

(Continued)

FOREIGN PATENT DOCUMENTS

| | | |
|---|---|---|
| CN | 102107615 A | 6/2011 |
| DE | 102005019946 A1 | 11/2006 |
| FR | 2962950 A1 | 1/2012 |

(Continued)

OTHER PUBLICATIONS

French Search Report, in French, corresponding to application No. FR1552877, dated Jan. 29, 2016, 2 pages.

(Continued)

*Primary Examiner* — Anthony D Barfield
(74) *Attorney, Agent, or Firm* — Reising Ethington P.C.

(57) ABSTRACT

A headrest assembly for a vehicle seat, that is height-adjustable along an adjustment direction. The headrest assembly includes a pin adapted to be fixed to a seat backrest and extending along the adjustment direction, an adjustment plate integrally secured to the one pin, and a supporting structure adapted to support a user's head, mounted so as to be adjustable in translation on the adjustment plate along the adjustment direction. The pin is covered by a covering portion. The covering portion and the adjustment plate are made of plastic material overmolded on the pin.

11 Claims, 6 Drawing Sheets

(51) Int. Cl.
    *B29K 705/00*     (2006.01)
    *B29L 31/30*      (2006.01)

(56)             References Cited

U.S. PATENT DOCUMENTS

2011/0148171 A1    6/2011   Charles et al.
2015/0298372 A1    10/2015  Bielsa et al.

FOREIGN PATENT DOCUMENTS

FR          2987792 A1    9/2013
FR          3010951 A1    3/2015
WO      WO2013188426 A1   12/2013

OTHER PUBLICATIONS

Written Opinion, in French, corresponding to application No. FR1552877, dated Jan. 29, 2016, 4 pages.
Chinese Office Action with English translation corresponding to Chinese application No. 201610198817.3, dated Nov. 24, 2017, 6 pages.
Chinese Office Action with English translation corresponding to Chinese application No. 201610198817.3, dated Jul. 30, 2018, 11 pages.
Chinese Office Action with English translation corresponding to Chinese application No. 201610198817.3, dated Feb. 12, 2019, 11 pages.

HEADREST ASSEMBLY FOR VEHICLE SEAT AND VEHICLE SEAT COMPRISING SUCH AN ASSEMBLY

FIELD OF THE INVENTION

The present invention relates to adjustable headrest assemblies for a motor vehicle seat and to vehicle seats incorporating such assemblies.

BACKGROUND

Known document DE 102005019946 for example describes a headrest assembly where the height can be adjusted relative to the backrest of a seat, by sliding the pins of the headrest within the backrest structure. With such assemblies, the height adjustment system is thus enabled by a translation between each pin and a socket provided inside the backrest of the seat. Also, the pins must by necessity be adapted to slide completely into the sockets to adjust the height of the headrest.

A disadvantage of such a headrest lies in the fact that the pins must by necessity present a surface specially adapted for sliding easily relative to the backrest, and in addition must be sufficiently rigid to avoid abrasion during repeated use.

Moreover, such an assembly comprises a large number of parts, and therefore may be long and costly to manufacture and assemble. In particular, it is necessary to first assemble a sheath within each socket of the backrest, and then to introduce the pins of the headrest into the sheaths so as to secure the headrest to the backrest. It is also necessary to provide guide elements separate from the pins, to ensure proper sliding of these pins within the backrest frame.

SUMMARY

The present invention aims to solve these disadvantages. The present invention may be used to provide a headrest assembly that is generally more aesthetically pleasing, is easier to manufacture, and is more simple to use.

The invention in at least some embodiments thus relates to a headrest assembly for a vehicle seat, that is height-adjustable along an adjustment direction, the headrest assembly comprising:

at least one pin adapted to be fixed to a seat backrest and extending along the adjustment direction, an adjustment plate integrally secured to the at least one pin, and a supporting structure adapted to support a user's head, mounted so as to be adjustable in translation on the adjustment plate along the adjustment direction, the at least one pin being at least partially covered by a covering portion, the covering portion and the adjustment plate being made of plastic material overmolded on the pin.

With these arrangements, the system for adjusting the height of the headrest is located at the plate, particularly in the upper part of the headrest. It is therefore unnecessary for the pin to slide within the backrest structure for the height adjustment. It is thus possible to improve the shape and appearance of the covering portion of the pin, in particular by overmolding, without limiting the headrest adjustment function.

In various embodiments of the invention, one or more of the following arrangements may possibly be used:

the headrest assembly comprises two pins, each of the two pins being covered by a covering portion;

the covering portion comprises relief patterns;

the covering portion and the adjustment plate are overmolded both at once onto the at least one pin;

the pin comprises an upper end and a lower end, the adjustment plate being located at the upper end of the pin, the headrest further comprising a mounting portion at the lower end of the pin that is intended to be fixed in a backrest frame;

the mounting portion is overmolded all at once onto the pin with the adjustment bracket and the covering portion so as to form a support structure, the support structure consisting of one piece; and the headrest assembly comprises two pins, the mounting portion comprising a first sheath and a second sheath respectively overmolded on the lower end of each pin.

The invention also relates to a method of manufacturing a headrest assembly according to the invention, comprising at least a step consisting of:

molding, by injection of plastic material, a plate and a covering portion, overmolded on a pin.

In one embodiment, the molding is carried out by injection of two plastic materials to overmold the adjustment plate and the covering portion onto the pin.

The invention also concerns a seat comprising a backrest and a head assembly, wherein said at least one pin is integral with the backrest, such that the supporting structure is height-adjustable relative to the backrest.

Of course, the different features, variants, and/or embodiments of the invention may be associated with one another in various combinations as long as they are not incompatible with or mutually exclusive of one another.

BRIEF DESCRIPTION OF THE DRAWINGS

The invention will be better understood, and other features and advantages will become more apparent, upon reading the following detailed description including an embodiment provided for illustrative purposes with reference to the accompanying figures, given by way of non-limiting examples which may help in better understanding the invention and the presentation of its implementation and, where appropriate, contribute to its definition, in which.

DETAILED DESCRIPTION

Note that in the figures, structural and/or functional elements common to the various embodiments may have the same references. Unless otherwise indicated, such elements therefore have identical structural, dimensional, and material properties.

For clarity, only those elements useful to understanding the described embodiments have been represented and will be detailed.

In the following description, when reference is made to absolute positional qualifiers such as the terms 'front', 'back', 'top', 'bottom', 'left', 'right', etc., or to relative qualifiers such as the terms 'above', 'below', 'higher', 'lower', etc., or to orientation qualifiers, these are in reference to a seat, and in particular to a headrest, in a normal position of use and in the ordinary direction of travel of the vehicle.

Figure 1:
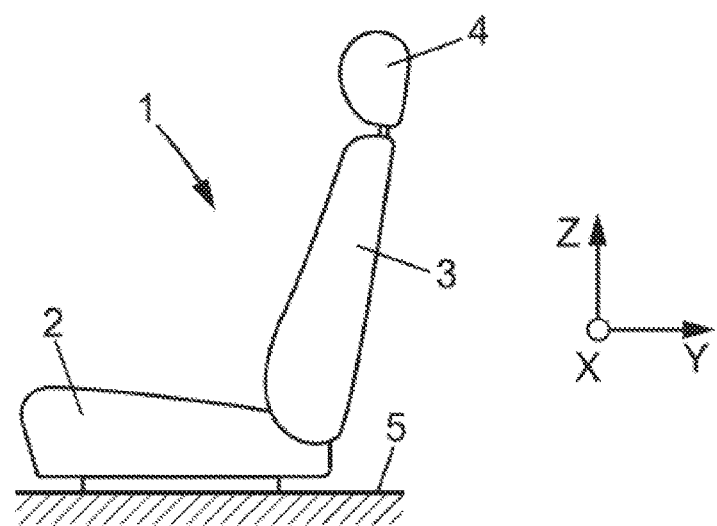
FIG. 1 is a schematic side view of a vehicle seat according to one embodiment of the invention.

FIG. 1 represents a seat 1 of a motor vehicle having a seating portion 2 intended to receive an occupant of the seat 1, and a backrest 3 supporting a headrest 4. The seat 1 is fixed to a fixed structure 5, in particular to the floor of the vehicle.

Figure 2:
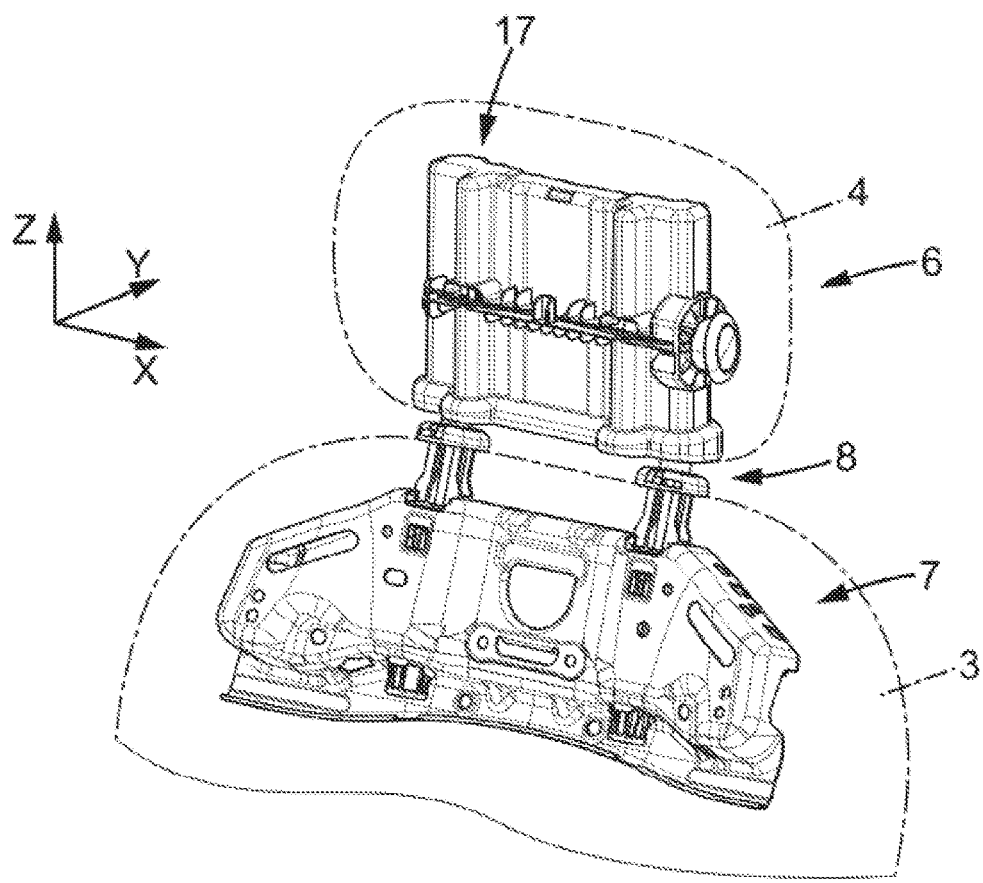
FIG. 2 is a perspective view of a headrest assembly according to an embodiment of the invention.
Figure 3:
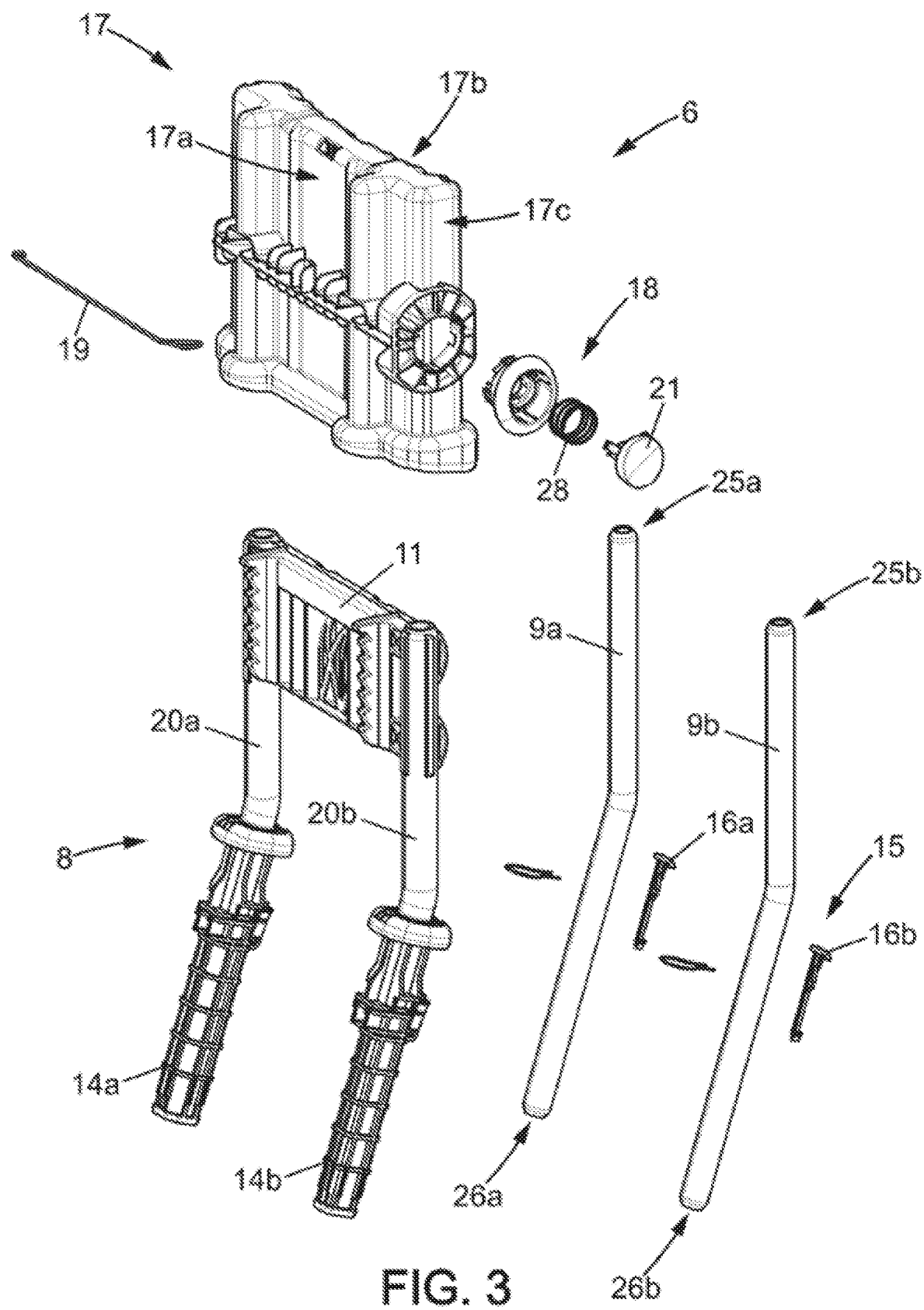
FIG. 3 is an exploded view of the headrest assembly of FIG. 2.
Figure 4:
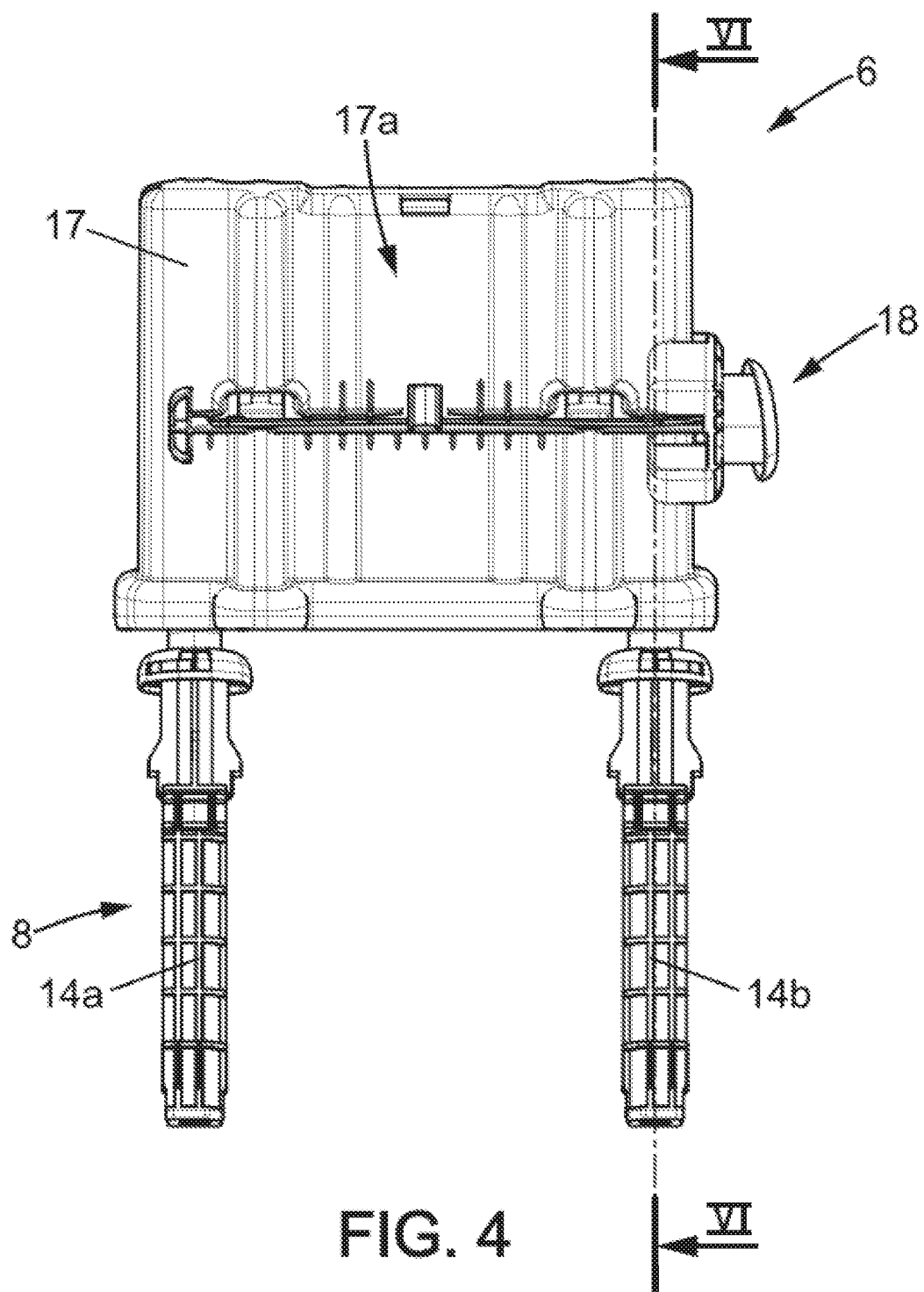
FIG. 4 is a front view of the headrest assembly of FIG. 3.

The headrest 4 comprises more specifically a headrest assembly 6. As illustrated in FIG. 2, the headrest assembly 6 can be connected to a backrest frame 7.

The headrest assembly 6 is connected to the backrest 3 via a support structure 8. The support structure 8 comprises at least one pin 9a, 9b. In the embodiment shown in the figures, the support structure 8 comprises two pins 9a, 9b, parallel to one another and extending substantially along an adjustment direction Z. The two pins 9a, 9b have a generally cylindrical external cross-section. The two pins 9a, 9b are preferably metal but may be of another material, such as plastic for example or some other material. The two pins 9a, 9b extend respectively between an upper 25a, 25b and a lower end 26a, 26b. Alternatively, the support structure 8 may comprise a metal tube of generally cylindrical external cross-section and having an inverted U shape.

The support structure 8 further comprises an adjustment plate 11. The adjustment plate 11 is, for example, a plate of substantially rectangular shape having a front face 11a and a back face 11b. The adjustment plate 11 extends transversely to an adjustment direction Z, between the pins 9a, 9b. The adjustment plate 11 is in particular secured at the upper ends 25a, 25b of the pins 9a, 9b. The adjustment plate is thus integrally secured to the pins 9a, 9b.

The front face 11a of the adjustment plate 11 comprises at least one indented element, and in the embodiment shown, two indented elements 12a, 12b, also called racks, comprising notches 13.

Each of the notches 13 comprises, for example, an abutment portion 13a having a surface perpendicular to the adjustment direction Z, in particular directed upwards, and a ramp 13b on the opposite side of the notch 13. Thus, the notches 13 advantageously have an asymmetrical profile. The arrangement of the notches 13 on the adjustment plate 11 creates a distance, called the pitch, between two notches 13, for example a pitch that is less than or equal to 5 mm.

The headrest assembly 6 also comprises a supporting structure 17. The supporting structure 17 comprises a front face 17a, suitable for supporting the head of an occupant of the seat 1, and a rear face 17b. The supporting structure 17 also comprises two side faces 17c respectively between the front face 17a and rear face 17b. The supporting structure 17, in particular the front and rear faces 17a, 17b, may be covered with padding and/or a covering lining schematically represented in dashed lines in FIG. 2. Thus, an occupant of the seat can rest his or her head against the front face 17a of the supporting structure 17 when seated on the seat 1.

Figure 6A:
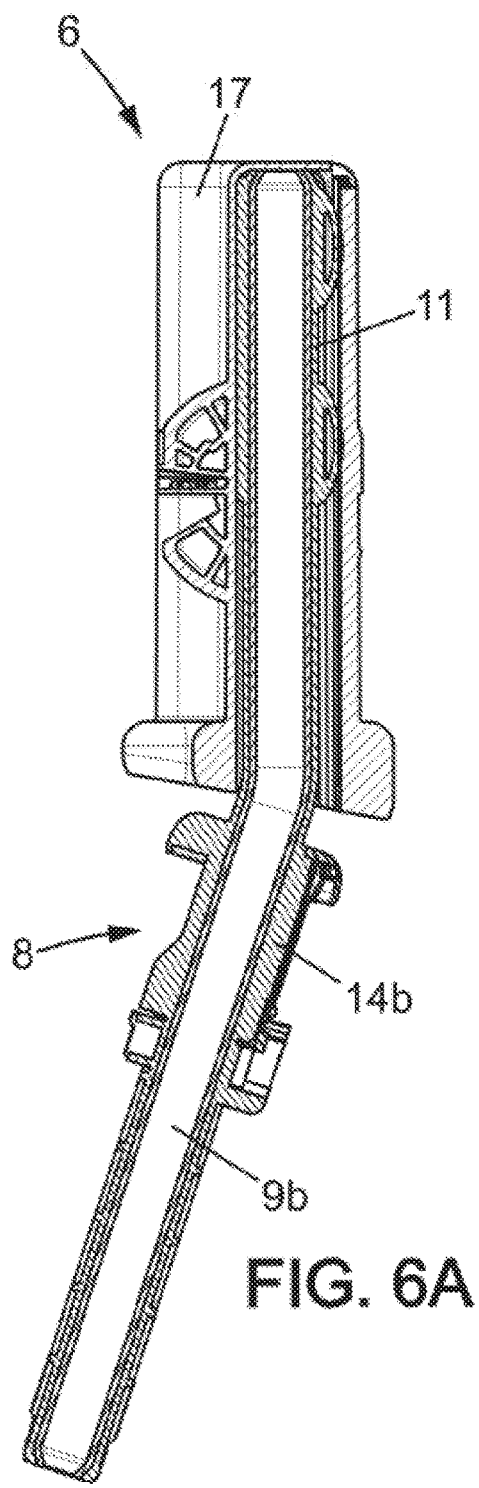
FIGS. 6A and 6B are sectional views along plane VI-VI of FIG. 4, in which the supporting structure is respectively in the lower position and the upper position on the support structure.
Figure 6B:
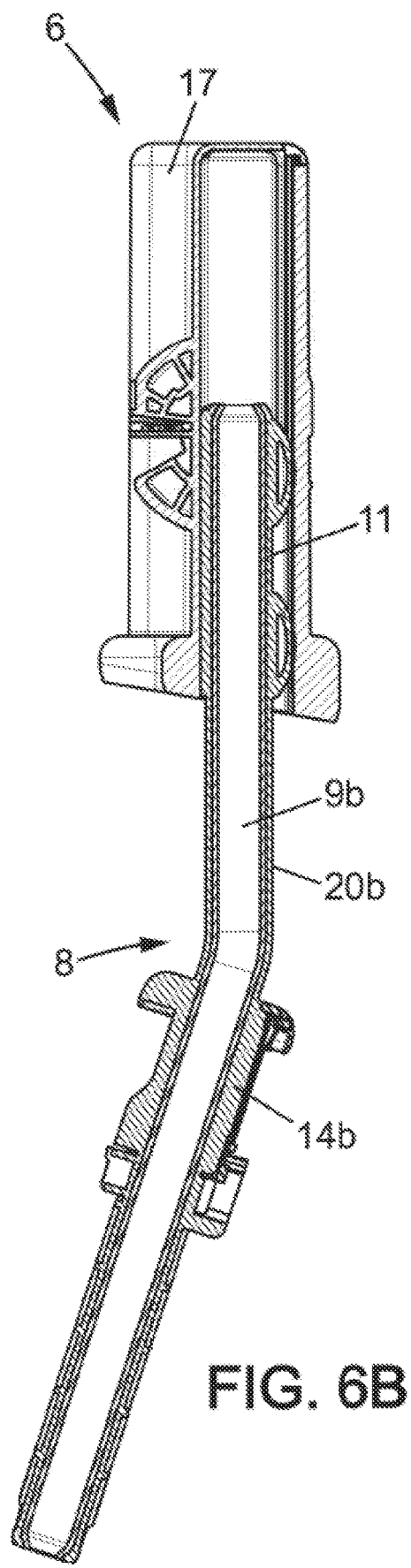

The supporting structure 17 is mounted on the support structure 8 so as to move in translation along the adjustment direction Z. More particularly, the supporting structure 17 is mounted on the adjustment plate 11 so as to move in translation along the adjustment direction Z. The supporting structure 17 thus makes it possible to adjust the position of the headrest 4 relative to the backrest 3. In particular, the headrest 4, specifically the supporting structure 17, can be adjusted between a low position and a high position as shown in FIGS. 6A and 6B respectively.

In addition, the adjustment plate 11 comprises ribs 22 or advantageously deformable guide elements 23 which protrude and extend along the adjustment direction Z. More particularly, these ribs 22 or guide elements 23 are located at the upper ends 25a, 25b of the pins 9a, 9b. These ribs 22 or guide elements 23 serve to guide the supporting structure 17 as it slides on the adjustment plate 11 along the adjustment direction Z.

To lock the position of the supporting structure 17 relative to the adjustment plate 11, the headrest assembly 6, in particular the supporting structure 17, may also comprise a locking system 18.

The locking system 18 comprises at least one locking wire 19. The locking wire 19 is supported and guided by the supporting structure 17.

In particular, the supporting structure 17, and specifically the side face 17c, comprises an operating button 21. The operating button 21 is connected to the locking wire 19 by means of a cylindrical opening arranged in a side face 17c of the supporting structure 17. The operating button 21 is actuated by a user of the seat 1, by pressing it between a locked position and an unlocked position. In the locked position, the locking wire 19 engages with at least one of the notches 13 of the adjustment plate 11, to prevent translational movement along the adjustment direction Z of the supporting structure 17, in at least one direction of movement. In the unlocked position, the locking wire 19 permits translational movement of the supporting structure 17 along the adjustment direction Z. It is then possible to adjust the position of the headrest 4, in particular the supporting structure 17, relative to the backrest 3. A biasing member 28, such as a spring, resiliently biases the operating button 21 toward the locked position.

Such a locking system 18 is known per se and will not be described in more detail. For example, document FR 13 59125 describes such a height-adjustable headrest comprising a locking system for selectively locking and unlocking the supporting structure 17 of the headrest 4.

The support structure 8 further comprises at least one mounting portion 14, and in the illustrated embodiment two mounting portions 14a, 14b. More particularly, the mounting portions 14a, 14b are fixed to the lower ends 26a, 26b of the pins 9a, 9b.

The mounting portion 14 shown in FIGS. 3, 4, 5A, 5B, comprises for example a first sheath 14a and a second sheath 14b respectively fixed around the pins 9a, 9b. The first and second sheaths 14a, 14b respectively surround the lower ends 26a, 26b of the pins 9a, 9b. Each of the first and second sheaths 14a, 14b is formed by a tubular body having an axis along the adjustment direction Z. Each of the first and second sheaths 14a, 14b also has a circular or square cross-section. The first and second sheaths 14a, 14b are preferably identical to each other.

The mounting portion 14, in particular each of the first and second sheaths 14a, 14b, is adapted to be arranged in housings, such as sockets provided in the backrest frame 7, or is adapted to be attached directly to the backrest 3. It is thus possible to fix the support structure 8 rigidly to the backrest 3 as shown in FIG. 2.

To lock the headrest 4 on the backrest 3, the support structure 8 may also comprise a retention system 15. In the embodiment shown in FIG. 3, the retention system 15 comprises two retaining elements 16a, 16b which respectively retain the mounting portion, specifically the first and second sheaths 14a, 14b, in the backrest frame 7.

Such mounting portions 14a, 14b and such a retention system 15 are known per se and will not be described in more detail.

The support structure 8 further comprises a covering portion 20, and in the embodiment shown, two covering portions 20a, 20b. In particular, each of the covering portions 20a, 20b covers a pin 9a, 9b between the adjustment plate 11, specifically at the upper end 25a, 25b of the pins 9a, 9b, and the mounting portion 14, specifically at lower ends 26a, 26b of the pins 9a, 9b. The covering portions 20a, 20b thus at least partially cover the pins 9a, 9b.

Due to the fact that the adjustment plate 11 is located on the upper portion of the pins 9a, 9b, the pins 9a, 9b, in particular the covering portion 20, are not used for adjusting the height of the headrest 4. In particular, it is not necessary for the headrest 4 to slide relative to the backrest 3 at the pins 9a, 9b, and in particular at the covering portions 20a, 20b covering the pins 9a, 9b. It is thus possible to change the appearance of these covering portions 20a, 20b by special embossing, or by the addition of color, shape, or reliefs.

Figure 7:
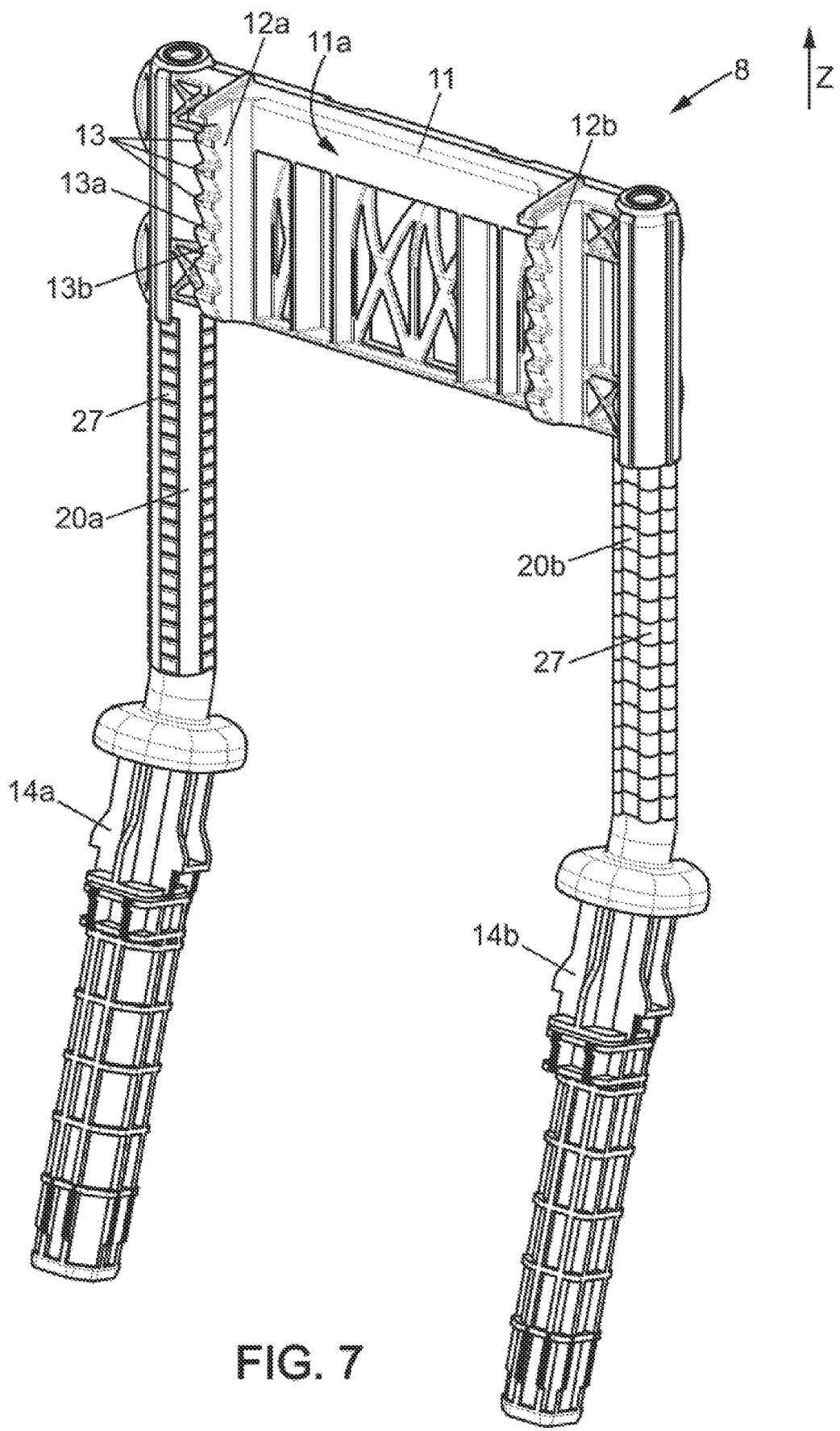
FIG. 7 is a perspective view of an embodiment of a support structure according to the invention.

FIG. 7 shows in particular an embodiment of the support structure 8 and in particular of the covering portions 20a, 20b. As represented in this FIG. 7, the covering portions 20a, 20b may include one or more relief patterns 27. Such patterns 27 may, for example, be recessed patterns and/or raised patterns. Such patterns may also have alternating smooth areas and relief areas. In particular, in the upper position represented in FIG. 6B, the supporting structure 17 does not cover the covering portion 20. The covering portion 20 is thus visible to a user, who can see these patterns 27. The covering portions 20a, 20b are preferably identical to each other or are different as shown for example in FIG. 7.

Figure 5A:
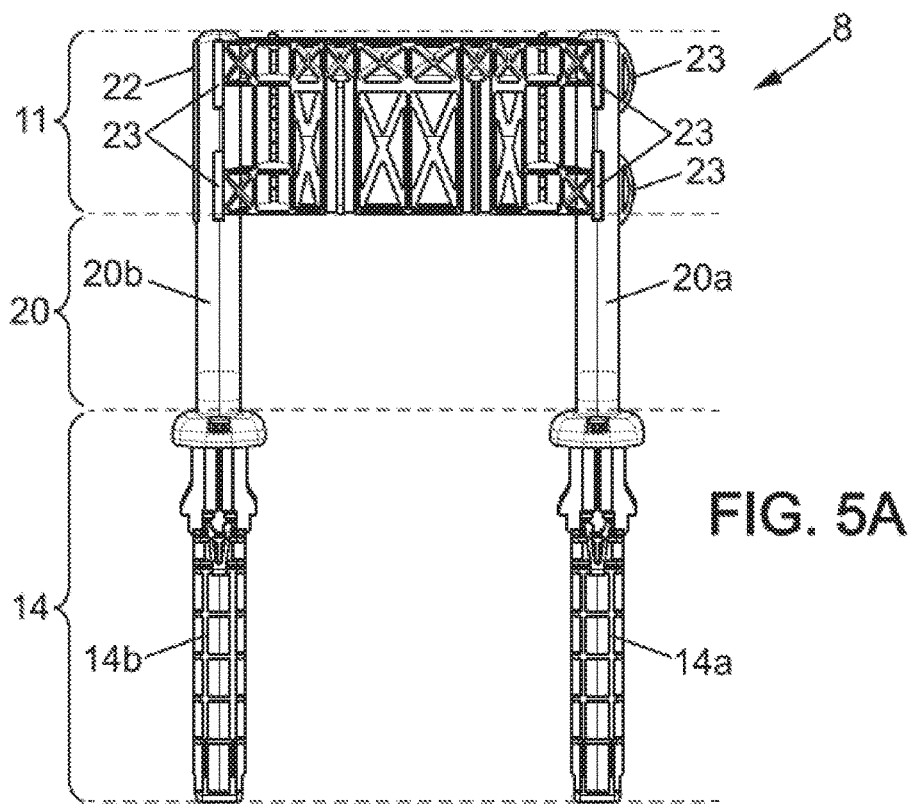
FIGS. 5A and 5B are views respectively from the front and back of a support structure of the headrest assembly of FIGS. 2 to 4.
Figure 5B:
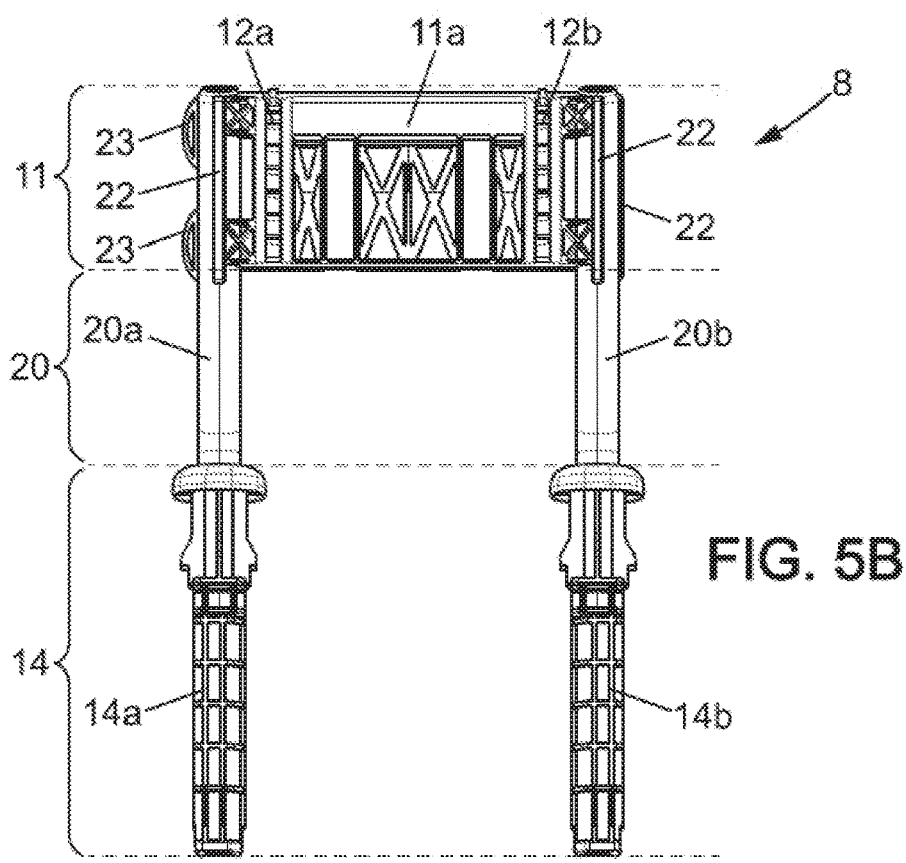

The adjustment plate 11, the covering portion 20, and the mounting portion 14 are formed all at once. "Formed all at once" is understood to mean that the adjustment plate 11, the covering portion 20, and the mounting portion 14 are formed with no discontinuity in their material, as can be seen for example in the sectional views of FIGS. 6A, 6B. More particularly, the adjustment plate 11, the covering portion 20, and the mounting portion 14 are overmolded on the pins 9a, 9b. In particular, the adjustment plate 11, the covering portion 20, and the mounting portion 14 integrally cover the pins 9a, 9b as shown in FIGS. 5A, 5B for example. The adjustment plate 11, the covering portion 20, and the mounting portion 14 are preferably overmolded of a plastic material onto the pins 9a, 9b.

Due to the fact that the adjustment plate 11, the covering portion 20, and the mounting portion 14 are overmolded on the pins 9a, 9b, the support structure 8 advantageously consists of one piece. From "one piece", it is understood that a user cannot separate the pins 9a, 9b from the plate 11, from the covering portion 20, and/or from the mounting portion 14.

In particular, the support structure 8 comprises, as a single member, headrest members that are usually distinct and separate from each other, such as the plate, the sheaths, or the ribs and guide elements. The result is a headrest 4 that is easy and economical to manufacture. The headrest 4 is also easier to use.

The invention also relates to a method of manufacturing the support structure 8 of the headrest 4, in particular a method of overmolding onto the two pins 9a, 9b.

In a first step of the manufacturing method, the pins 9a, 9b are placed in a mold. In a second step of the manufacturing method, the mold is closed and the plate 11 and covering portion 20 are molded by injection of plastic, overmolding the pins 9a, 9b. This forms a support structure 8 comprising the pins 9a, 9b onto which the adjustment plate 11 and the covering portion 20 are overmolded. As discussed above, a mounting portion 14 may also be overmolded around the pins 9a, 9b in this same step, specifically at the lower ends 26a, 26b of the pins 9a, 9b.

Alternatively, it is possible to inject successively or simultaneously two different plastic materials in the second step of the method, for example of different textures or colors. One can thus obtain a covering portion 20 that is aesthetically pleasing to a user of the seat 1.

The pins 9a, 9b, and in particular the intermediate portion of the pins 9a, 9b comprised between the mounting portion 14 and the plate 11, are therefore covered with plastic material. Depending on the mold used, relief patterns 27 may further be formed on the covering portion 20 of the support structure 8.

The invention also relates to a seat 1 comprising a backrest 3 and a headrest 4 as described above, wherein the pins 9a, 9b are integral with the backrest 3, such that the supporting structure 17 is height-adjustable relative to the backrest 3.

Of course, the invention is not limited to the embodiments described above and provided solely as examples. It covers various modifications, alternative forms, and other variants conceivable to persons skilled in the art within the scope of the invention, particularly any combination of the various modes of operation described above, which may be applied separately or in combination.

The invention claimed is:

1. Headrest assembly for a vehicle seat, that is height-adjustable along an adjustment direction, the headrest assembly comprising:
   at least one pin adapted to be fixed to a backrest of a seat and extending along the adjustment direction,
   an adjustment plate integrally secured to the at least one pin, and
   a supporting structure adapted to support the head of a user, mounted so as to be adjustable in translation on the adjustment plate along the adjustment direction,
   wherein the at least one pin is at least partially covered by a covering portion, the covering portion and the adjustment plate being made of plastic material overmolded on the pin, and
   wherein the covering portion protrudes relative to the supporting structure in at least one position of the supporting structure with regard to the adjustment plate.

2. Headrest assembly according to claim 1, comprising two pins, each of the two pins being covered by a covering portion.

3. Headrest assembly according to claim 1, wherein the covering portion comprises relief patterns.

4. Headrest assembly according to claim 1, wherein the covering portion and the adjustment plate are overmolded both at once onto the at least one pin.

5. Headrest assembly according to claim 1, wherein the pin comprises an upper end and a lower end, the adjustment plate being located at the upper end of the pin, the headrest assembly further comprising a mounting portion at the lower end of the pin that is intended to be fixed in a backrest frame.

6. Headrest assembly according to claim 5, wherein the mounting portion is overmolded all at once onto the pin with the adjustment plate and the covering portion so as to form a support structure, the support structure consisting of one piece.

7. Headrest assembly according to claim 6, comprising two pins, the mounting portion comprising a first sheath and a second sheath respectively overmolded on the lower end of each pin.

8. Headrest assembly according to claim 5, comprising two pins, the mounting portion comprising a first sheath and a second sheath respectively overmolded on the lower end of each pin.

9. Seat comprising a backrest and a headrest assembly according to claim 1, wherein said at least one pin is integral with the backrest, such that the supporting structure is height-adjustable relative to the backrest.

10. Method of manufacturing the headrest assembly according to claim 1, comprising:
- providing at least one pin adapted to be fixed to a backrest of a seat and extending along an adjustment direction;
- providing a supporting structure adapted to support a head of a user;
- molding, by injection of plastic material, an adjustment plate and a covering portion, overmolded on said pin; and
- mounting said supporting structure so as to be adjustable in translation on the adjustment plate along the adjustment direction, the at least one pin being at least partially covered by a covering portion, wherein the covering portion protrudes relative to the supporting structure in at least one position of the supporting structure with regard to the adjustment plate.

11. Manufacturing method according to claim 10, wherein the injection molding is carried out by injection of two plastic materials to overmold the adjustment plate and the covering portion onto the pin.

* * * * *